United States Patent [19]
Enzmann

[11] 3,894,949
[45] July 15, 1975

[54] SEPARATOR APPARATUS FOR SEPARATING LIQUIDS FROM A LIQUID MIXTURE

[76] Inventor: Siegmund J. Enzmann, 5222 Athens Ave., Racine, Wis. 53206

[22] Filed: Feb. 4, 1974

[21] Appl. No.: 439,355

Related U.S. Application Data

[63] Continuation-in-part of Ser. No. 400,783, Sept. 26, 1973, abandoned.

[52] U.S. Cl. ................ 210/109; 210/197; 210/540
[51] Int. Cl.² ........................................ B01D 21/26
[58] Field of Search .......... 210/259, 167, 540, 512, 210/DIG. 21, 197, 261, 262, 104, 109

[56] References Cited
UNITED STATES PATENTS

| | | | |
|---|---|---|---|
| 2,284,737 | 6/1942 | Hirshstein | 210/540 X |
| 2,585,878 | 2/1952 | Tryon | 210/540 |
| 2,955,714 | 10/1960 | Goins | 210/540 X |
| 3,225,928 | 12/1965 | Black | 210/540 X |
| 3,341,983 | 9/1967 | Balmenhoff et al. | 210/512 X |
| 3,447,688 | 6/1969 | MacCabe | 210/540 X |
| 3,540,588 | 11/1970 | Estabrook | 210/512 X |
| 3,709,369 | 1/1973 | Brill et al. | 210/DIG. 21 |
| 3,731,802 | 5/1973 | James | 210/540 X |

*Primary Examiner*—John Adee
*Attorney, Agent, or Firm*—Arthur J. Hansmann

[57] ABSTRACT

Separator apparatus for separating liquids from a liquid mixture having liquids of different weights, including a tank having an inlet opening. A liquid conduit is in liquid-flow communication with the bottom of the tank and extends upwardly from its entrance opening for flotationally filling with liquid from the lower portion of the tank, and the conduit has a liquid outlet disposed at an elevation higher than the elevation of the inlet opening of the conduit. A liquid skimmer member is disposed on the tank for presenting a tank outlet to establish the upper level of liquid mixture in the tank and for skimming the lighter weight liquid off the top of the mixture. The conduit is adjustable in the elevation of its outlet, and the skimmer member is also adjustable for adjusting the liquid level in the tank. The entire apparatus is related to a hydro-cyclotron which processes and passes the liquid mixture to the inlet tank. Another embodiment shows the aforementioned, and it also shows controls for elevating the adjustable baffle, and it shows mechanism for moving the upper layer of lighter weight liquid to the outlet of the tank, including mechanism for cleaning the liquid moving mechanism.

17 Claims, 16 Drawing Figures

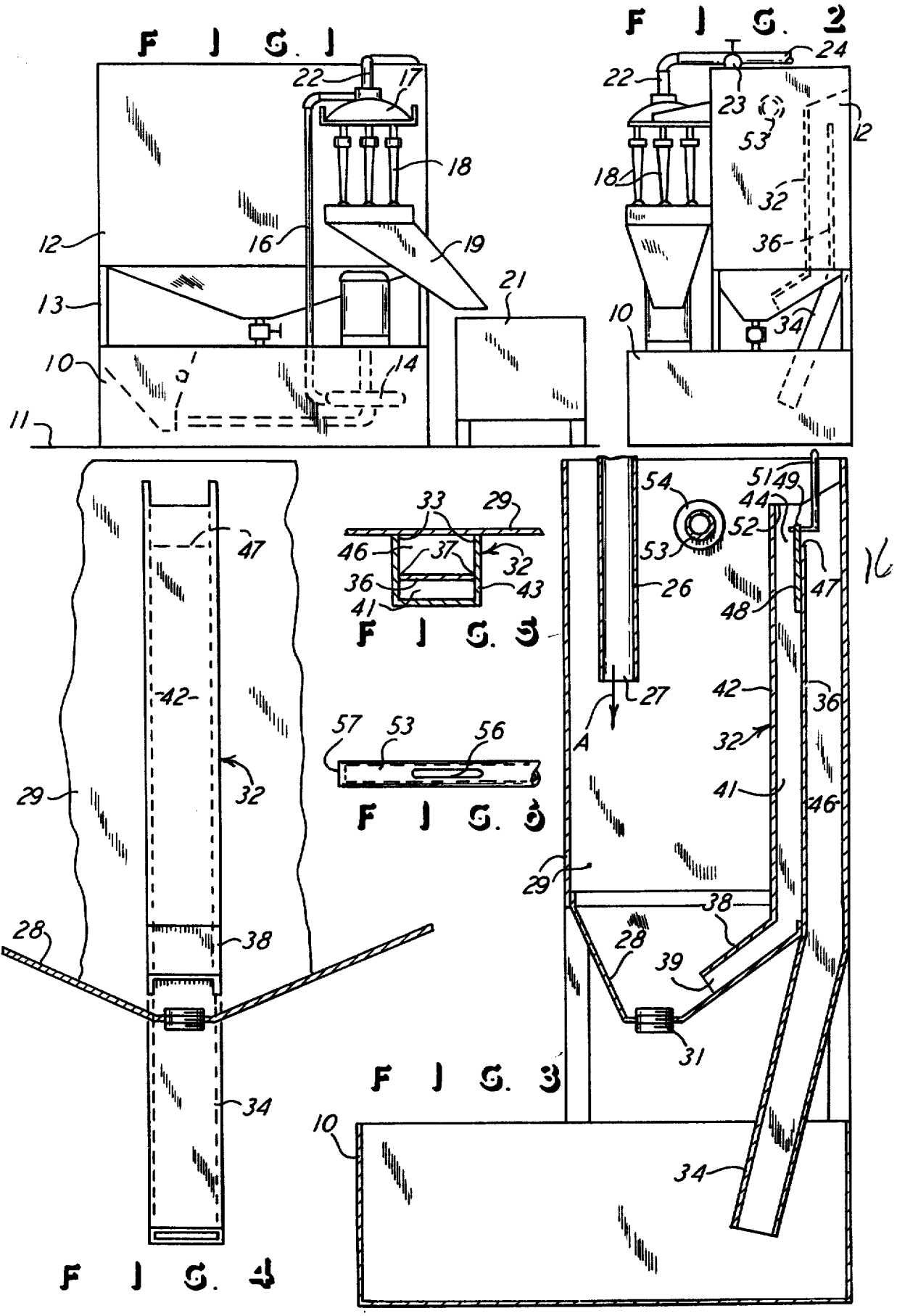

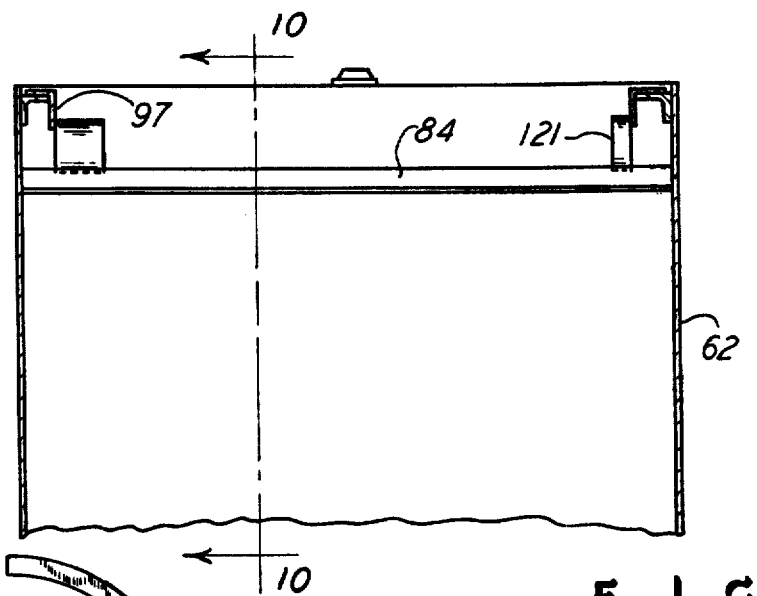
FIG. 9
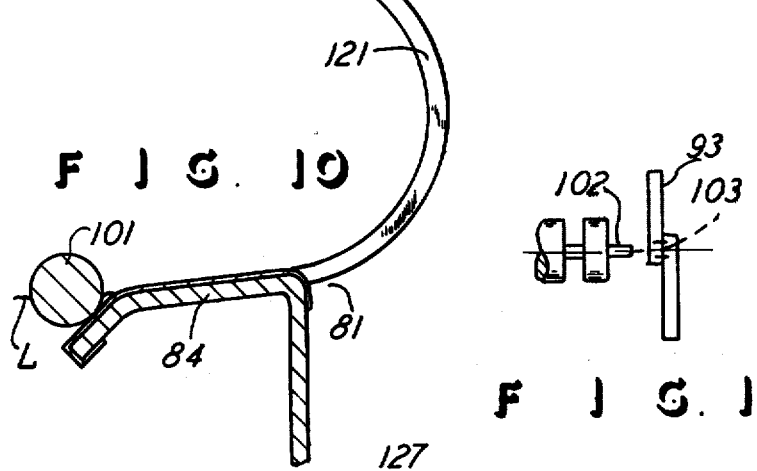
FIG. 10
FIG. 13
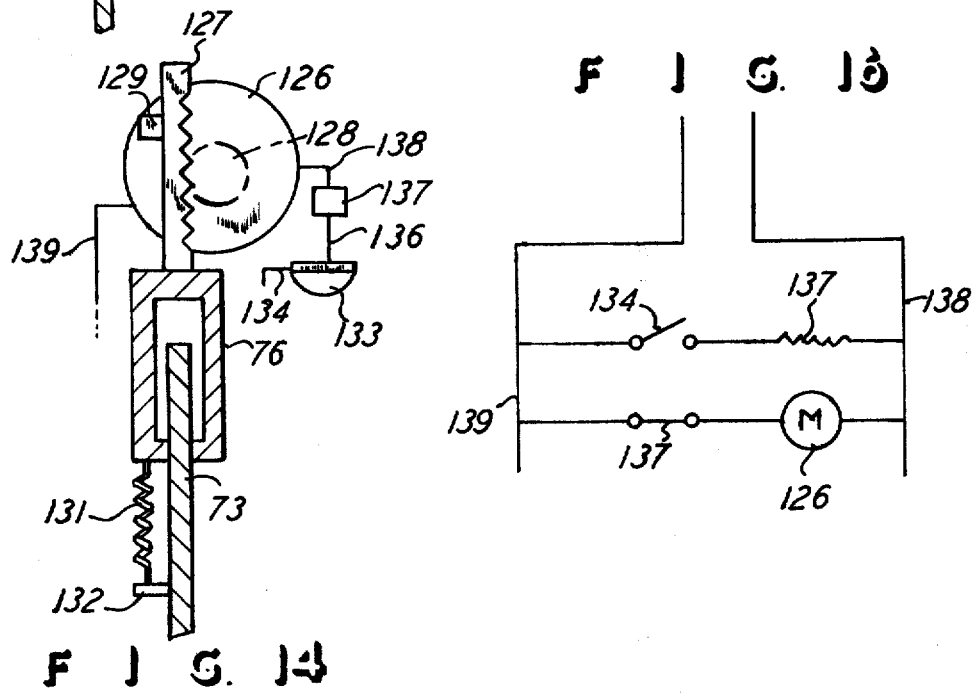
FIG. 14
FIG. 15

SEPARATOR APPARATUS FOR SEPARATING LIQUIDS FROM A LIQUID MIXTURE

This application is a continuation-in-part of U.S. application Ser. No. 400,783, filed Sept. 26, 1973, and entitled SEPARATOR APPARATUS FOR SEPARATING LIQUIDS FROM A LIQUID MIXTURE, and now abandoned.

This invention relates to separator apparatus for separately recovering different ingredients from a liquid mixture consisting of liquids of at least two different weights, and, more particularly, it pertains to apparatus for use in connection with a hydro-cyclotron where a liquid mixture of different weights of liquids is passed to the apparatus which separates the liquids by flotation, and the mixture also has solid particles therein which may be removed from the mixture by this apparatus.

BACKGROUND OF THE INVENTION

The use of a hydro-cyclotron is common in the industry where a liquid contains certain particles, such as solids, and it is desired that the solids be separated from the liquid. To do this, the hydro-cyclotron receives the mixture under a pressure, and the mixture is swirled in the hydro-cyclotron such that centrifugal force causes the particles to move radially outwardly of the swirl and to deposit out while at the same time the remaining liquid is caused to move upwardly in the swirl configuration. In this apparatus and process, the particles are separated from the liquid, and the liquid is passed to a receiving tank. Some of the particles may remain in the liquid mixture, and the liquid mixture itself is commonly composed of liquids of two different weights. Thus, in industrial machining, a coolant is applied to the work piece and tool and it consists of a water and additives. This coolant flushes the work piece and picks up metal chips and the like, and it also picks up lubricating oil from the machine and the work piece, and this is passed to either a discarding point or to a recovey apparatus. Where it is processed through recovery apparatus, this apparatus may consist of the hydro-cyclotron which is commonly known in the industry and which is briefly described above. However, when the particles are separated from the mixture and the hydro-cyclotron passes the remaining liquid mixture into a tank, the liquid mixture still includes the mixed water and oil. Under present-day concerns about the dumping of oil and like additives which may be in the coolant, it is important to separate the water and oil, and the oil can then be either re-used or dumped without having the water mixed with it, and therefore the dumping process is simplified since it is a lesser quantity to handle.

The present invention is therefore concerned with the separation of the water from the oil, and it is also concerned with the further removal of particles which may exist in the mixture after it has passed through the hydro-cyclotron. Accordingly, it is a primary object of this invention to provide apparatus which will process the liquid mixture and separate the water and oil so that they can be separately recovered from the coolant or like mixture of liquids of two different weights.

Still further, it is an object of this invention to provide separator apparatus of the type described above and wherein the apparatus can be readily and easily provided and the separating function can be achieved with a minimum of expense and with apparatus which is not subject to moving parts which might require operating attention and servicing attention. Accordingly, the present invention provides apparatus which is simplified, reliable, and which automatically operates utilizing the flotation principle of the two different weights of liquids which separate themselves by virtue of the lighter weight liquid floating on top of the heavier weight liquid.

Still another object of this invention is to provide apparatus of the type mentioned above and to incorporate adjustable members which permit the variation in the amount of skimming of the upper lightweight liquid from the liquid mixture.

Still further, it should be and will be understood by one skilled in the art that the apparatus of this invention can be used for separating other additives from water or the like, and it can be used for separating a paint stripper from water or the like. That is, it can be used in any instances where liquids of two different weights are in the original liquid mixture.

Another object is to provide an adjustable baffle on the outlet of the apparatus, and to have control mechanism, such as a sensor and a motor, for adjusting the baffle according to the presence of the upper layer of the lighter weight liquid in the tank.

Still another object of this invention is to provide a mechanism for moving the upper layer of the lighter weight liquid in the tank to the outlet of the tank so that the tank and its apparatus can effectively and efficiently move the upper layer of liquid and separate it from the remainder of the liquid in the tank.

Other objects and advantages will become apparent upon reading the following description in light of the accompanying drawings.

BRIEF DESCRIPTION OF THE DRAWINGS

FIG. 1 is a side elevational view of the apparatus incorporating this invention.

FIG. 2 is an end elevational view of the apparatus shown in FIG. 1 with additional parts shown and with one part removed.

FIG. 3 is an enlarged sectional view of a portion of the apparatus shown in FIG. 2.

FIG. 4 is a front elevational view of a portion of the apparatus shown in FIG. 3.

FIG. 5 is a top plan view of a portion of the apparatus particularly as shown in FIGS. 3 and 4.

FIG. 6 is a side elevational view of a fragment of one part shown in FIG. 3.

FIG. 9 is a sectional view taken on the line 9—9 of FIG. 8.

FIG. 10 is an enlarged sectional view taken on the line 10—10 of FIG. 9.

FIG. 14 is an enlarged side elevational view of a fragment of the apparatus shown in FIG. 7.

FIG. 15 is a top plan view of a fragment of the apparatus shown in FIG. 7.

FIG. 16 is an electric schematic view for the apparatus shown in FIG. 7, and FIG. 14.

DETAILED DESCRIPTION OF THE PREFERRED EMBODIMENTS as

Figure 8:
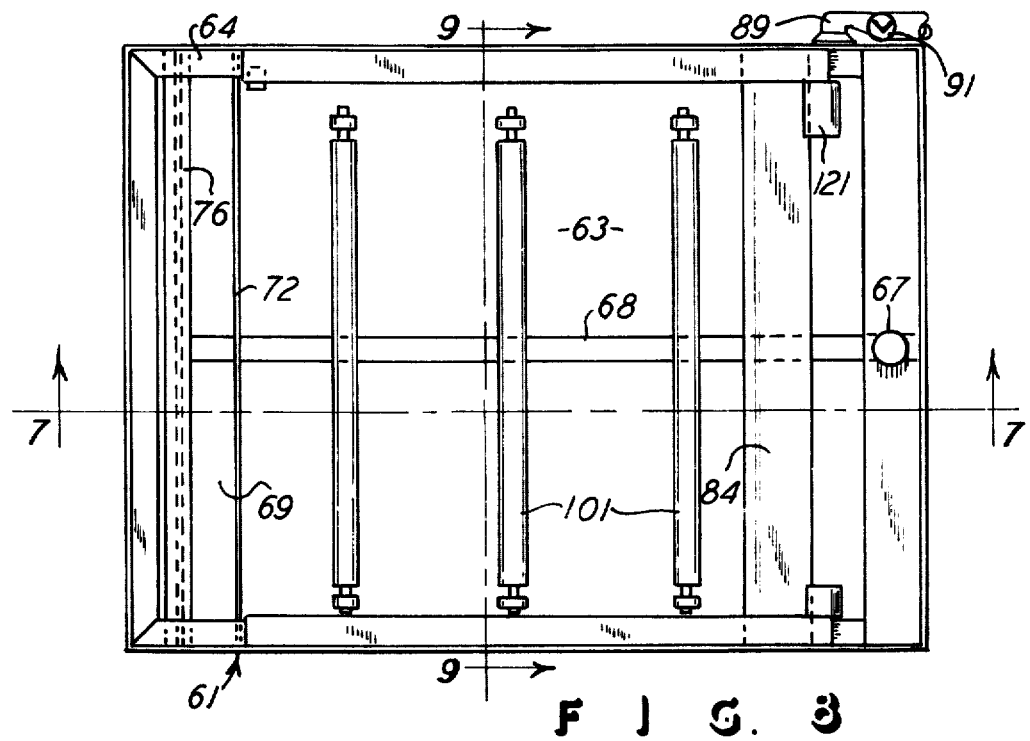
FIG. 8 is a top plan view of FIG. 7.

FIGS. 1 and 2 show the complete apparatus which includes a lower liquid tank 10 disposed on a floor designated 11, and there is an upper liquid tank 12 supported on legs 13 and disposed above the tank 10. It will be understood that the contaminated liquid mixture will be introduced into the tank 10, and this may be the mixture coming from a machine which has the coolant carrying the water and oil and additives and metal chips or parts, by way of one example of the liquid mixture. The mixture is directed to a liquid pump 14 which pumps the liquid from the tank 10 and up through a pipe 16 and into the plenum 17 of the hydro-cyclotron which has the nozzles or units 18. The units 18 are of any conventional construction, and it will be understood that the liquid mixture is introduced into the units 18 under a liquid pressure, and the arrangement is such that the liquid is caused to swirl in a pattern which causes the solids, such as the metal chips, to move out of the liquid and fall into a chute 19 and eventually into a deposit cart or the like 21. Also by virtue of the conventional hydro-cyclotron construction and its function, the cleaner liquid mixture is passed through the pipe 22 and it may go through the valve 23 and to a pipe 24 and be returned to the machine. Alternatively, the mixture flowing in the pipe 22 can be directed into the upper tank 12 through a pipe 26 which connects with the pipe 22 and which extends into the tank 12 and has its outlet end 27 disposed well within the tank 12, a seen in FIG. 3. Thus the pipe 26 forms the fluid inlet for the tank 12.

It will be seen that the tank 12 includes a bottom 28 and side walls 29 for containing the liquid mixture in a fluid-tight manner, and there may be a drain plug 31 in the bottom 28, but the liquid cannot normally flow from the tank 12 other than in the path described hereinafter, in normal use.

FIGS. 2 through 5 show that the tank 12 has an upstanding partition or wall 32 which is U-shaped and which is fluid tight with the tank upright wall 29, particularly as seen in FIG. 5, and thus the U-shaped piece 32 is fluid tight at the joints designated 33 and relative to the wall 29. The lower end of the piece 32 has an extension 34 which is shown to be an enclosed rectangular tube and extends from the upper tank 12 and into the lower tank 10, and this gives a re-circulation of the liquid between the tanks, if desired. The drawings also show an upright member 36 extending within the U-shaped member 32 and being fluid tight therewith at the junctures designated 37. Further. the lower end of the piece 32 extends in a portion 38 which is along the tank bottom 28, and it has a lower open end designated 39 and this is for the inlet of liquid from the tank 12 and up into the conduit designated 41 and defined by the outer wall 42 and the partition 36 as well as the portions 43 of the piece 32, as seen in FIG. 5. That is, a liquid conduit 41 is formed by the pieces shown and described, and it will therefore be understood that the conduit 41 is liquid tight relative to the tank 12 except for the lower inlet end 39 of the conduit 41, and the conduit extends upwardly to a liquid outlet end designated 44. It will therefore be understood that when liquid builds up in the tank 12 and to a level which is above the upper edge of the piece 36, the liquid will flow over the upper edge of the piece 36 and down through the conduit or opening designated 46 which is defined by the pieces as best seen in FIGS. 3 and 5. Accordingly, only the heavier weight liquid, such as water as compared to lighter weight oil, will flow up the conduit 41 and out of the tank 12 as it flows down the passageway or conduit 46. The upper edge 47 of the piece 36 can define the upper limit of the liquid level in the tank 12, and it will be seen that there is an uprightly movable adjustment piece 48 on the partition 36 so that the upper edge 49 of the piece 48 will actually define the upper level of the liquid in the tank 12. Also, a control 51 is connected to the adjustable piece 48 so that the level of the liquid in the tank 12 can be adjusted according to the positioning of the elevation of the upper edge 49.

Also, it will be seen that the upper edge 52 of the piece 32 is above the edge 47 and 49 so that liquid will not flow over the edge 52 and into the outlet passageway 46. That is, oil will not flow over the top edge 52, but only water can flow up from the bottom of the tank 12 and out the outlet passageway 46.

With this arrangement, if the level in the tank 12 dropped below the level of the edge 49, then there would be no flow from the tank 12, and thus the oil would not flow from the tank and out the conduit 41 nor out the outlet passage 46. Therefore, the apparatus is self-regulating as to the flow of the heavier weight liquid, commonly the water as compared to oil, from the tank 12.

A liquid skimmer member 53 is disposed to be in flow communication with the tank 12, and it is shown to be a conduit extending into the tank 12 through a conventional type of liquid sealer 54 which causes the member 53 to be liquid tight with the tank but rotatable about the longitudinal axis of the elongated member 53, as it is seen at its extended end in FIG. 6. The member 53 has a slot 56 therein, and this forms a liquid inlet opening into the member 53 which has a closed end at the end 57 so that the liquid can enter the member 53 only through the slot 56. It will therefore be understood that rotation of the member 53 about its longitudinal axis will adjust the elevation of the inlet opening 56, and the member 53 is disposed at an elevation higher than the overflow edge 47 and the overflow edge 49, and thus the member 53 is a liquid skimmer which takes the oil from the top of the liquid mixture in the tank 12 and drains it from the tank. Also, the member 53 and its inlet 56 are shown disposed at a level lower than the elevation of the edge 52, so liquid cannot flow over the edge 52. The liquids separate by virtue of their different weights, and the conduit 41 takes the heavier weight water from the bottom of the tank 12 and the liquid skimmer member 53 takes the lighter weight liquid from the top of the tank 12, such as the machine and work piece oil known as tramp oil. In this arrangement, the liquid skimmer 53 is disposed at an elevation higher than the elevation of the conduit outlet 44, for the liquid separation process mentioned. Also, the member 53 has its circular tubular surface as the side wall in which the inlet opening 56 is located and is shown to be an elongated slot for quantity of flow into the member 53, and conduit 53 may be a vacuum line for removing particles. Also, the hydro-cyclotron heads 18 pass the liquid mixture to the inlet pipe 26 under a liquid pressure, and the liquid is directed to the tank bottom 28, as shown by arrow A in FIG. 3. This pressure and direction of the liquid coming from the pipe 26 causes the liquid to flush the bottom of the tank 12 and to cause the particles which may be in the liquid mixture to flow through the liquid conduit 41. In this flushing action, any particles which are in the lower portion of the tank 12 will tend to be flushed out of the tank through the conduit 41, and the suction conduit 53, and they can then be directed back into the lower tank 10 and re-cycled through the hydro-cyclotron, if desired. The arrangement of the two tanks 10 and 12 provides the desired tank capacity for storage and cooling, and the conduit 41 permits filling of the tank 10.

The embodiment shown in FIGS. 7 through 16 includes the tank 61 which has its upright side walls 62 and its bottom 63 all disposed to enclose the liquid mixture therein. Therefore, the tank has a bottom portion which is of course adjacent the bottom 63, and it has an upper portion which is adjacent angle irons 64 extending along the upper edge or portion of the tank 61. The tank has an inlet opening 66 which is shown to extend across the width of the tank as seen in FIG. 8, and it introduces the liquid mixture into the tank through an inlet pipe 67 and causes the liquid mixture to flow in the direction of the arrow designated D shown in FIG. 7. Thus the liquid mixture is introduced into the tank 61 at the bottom portion of the tank, and a longitudinally extending divider or rib 68 extends along the tank bottom 63 to assure that the incoming liquid flows across the whole width of the tank and thereby flushes the tank bottom 63 and moves the fines and the like along the tank and in the direction of the arrow E. The tank has an upright liquid passageway 69 which is in flow communication with the tank at the bottom portion thereof so that the flow of liquid from the bottom of the tank moves up into the passageway 69, and it may create the liquid level designated L in FIG. 7.

Figure 7:
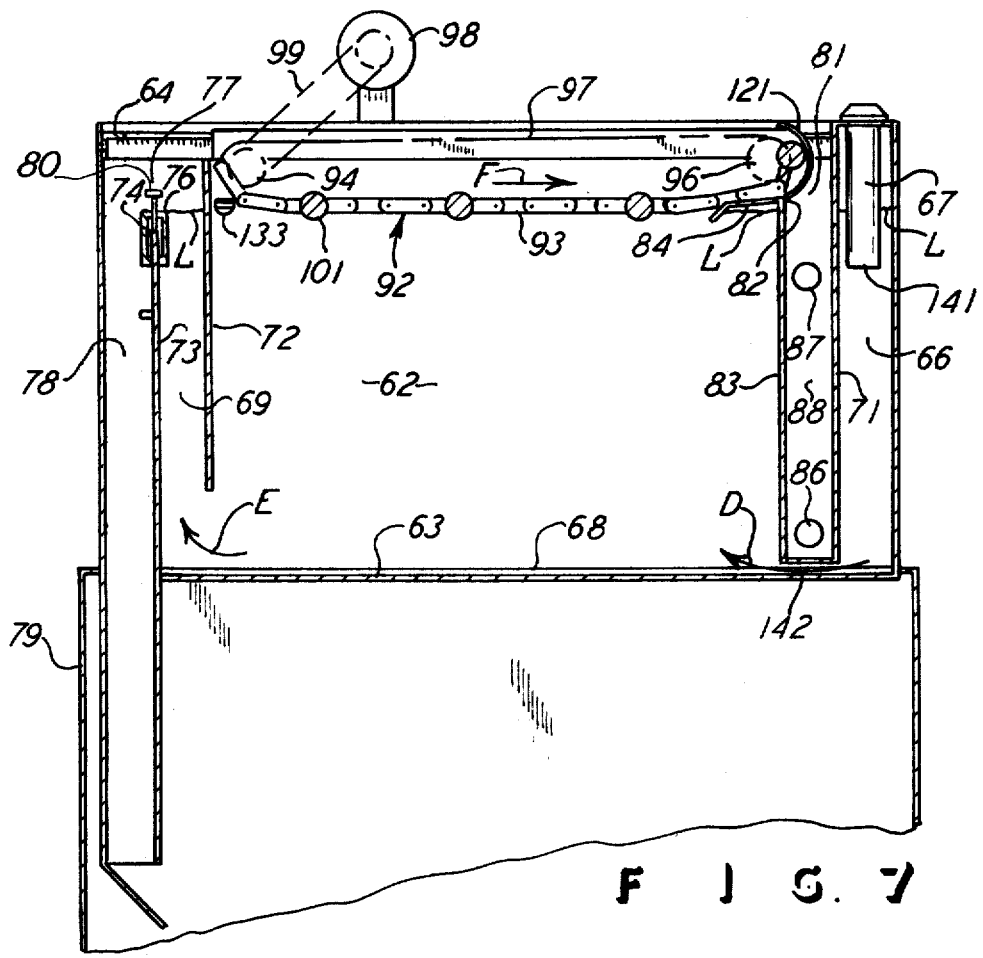
FIG. 7 is a sectional view taken from the side and of another embodiment of this invention, and being taken generally along the line 7—7 of FIG. 8.

Accordingly, the tank inlet opening 66 is defined by the outer wall 62 and a wall 71 which extends from the top of the tank and down to a location spaced from the tank bottom 63, as shown. The tank upright passageway 69 is defined by a vertical wall 72 and a wall 73, both of which extend across the width of the tank as shown in FIG. 8. The wall 72 is spaced from the tank bottom 63 to permit flow up into the passageway 69. The wall 73 terminates at its upper edge 74 which is below the by of the tank defined by the angle iron 64, and an adjustable baffle 76 may be disposed on the wall 73 at the upper edge thereof, as shown in FIGS. 7, 8, and 14. The arrangement described thus provides a liquid outlet 77 at the upper end of the passageway 69, and the overflowing liquid can move through an outlet passageway 78 which extends downwardly to a lower tank 79 or the like.

Therefore, the liquid mixture entering the tank through the inlet opening 66 will fill the tank to the level designated L, and above that level there will be an overflow from the tank and through the liquid outlet designated 77. Where the incoming liquid mixture is say of oil and water, the lighter weight oil will float to the top of the mixture and be present at the level designated L to provide a layer of oil, but only the heavier weight liquid in the mixture will enter the passageway 69 to move from the tank through the passageway 69 since the heavier weight mixture moves as shown by the arrow E and is at the bottom of the tank, and screw 80 can adjust baffle 76.

The tank has a liquid flow outlet opening designated 81 and this opening is defined by the upper edge 82 of a wall 83 extending across the width of the tank, as seen in FIG. 8. Also, a shelf 84 extends into the tank and slightly downwardly relative to the upper edge 82, as shown in FIG. 7. When no oil is in the tank, the member 76 is set at an elevation which is lower than the elevation of the edge 82. When oil is present in the larger or main section of the tank, that is between the walls 72 and 83, then the member 76 is set to have level L so that the upper layer of oil will overflow at the edge 82 and move out the liquid flow outlet opening 81 and into the chamber defined by the walls 71 and 83 and ultimately out either of the openings 86 or 87 which extend in flow communication with the chamber 88 and outside the tank 61, as shown by the outlet pipe 89 in FIG. 8. There are two such outlet lines 89, one for each outlet 86 and 87, and there are thus then two valves 91 on the two lines 89, and thus the flow may be controlled through the outlets 86 and 87, and this can be for additional separation of a lighter weight liquid moving out the upper outlet 87 relative to the lower outlet 86, if desired.

In the event there is no oil in the liquid in the main portion of the tank, then the outlet 77 is disposed at an elevation where all of the outgoing liquid will be through the passageway 69 and none will go through the outlet opening 81. Of course it is the positioning of the outlet 77, by means of the adjustable member 76 if that be used, which determines the level of the liquid in the tank and this therefore can determine the direct overflow of the liquid through the outlet opening 81.

A mechanism generally designated 92 is mounted on the tank to move the lighter weight liquid toward the outlet opening 81 when desired. The mechanism 92 is shown to include a chain 93 and two sprockets 94 and 96 which are shown in dot-dash lines and which would be mounted on the tank in any conventional way for moving the chain 93 in the direction of the arrow designated F in FIG. 7, and of course the chain would extend across the top of the sprockets 94 and 96 to be endless and be in the extent designated by the dot-dash line 97. A motor 98 is mounted on the tank and has a chain 99 shown in dot-dash lines extending to the sprocket 94 for moving the chain in the direction mentioned. The chain has cylindrical members 101 attached thereto at spaced apart points along the chain, and these members are preferably of a length which extends virtually across the width of the tank and which are suitably rotatably affixed to the chain to move therewith and to ride through the layer of lighter weight liquid in the mixture, such as the oil, and thus move the oil to the outlet 81. The pushers or members 101 thus ride up on the shelf or ledge 84 as they approach the outlet 81 and bring the oil to the outlet 81. FIG. 15 shows one arrangement as to how the members 101 may be rotatably mounted with the chain in that they have ends 102 which can be disposed in openings 103 on the chain 93, and of course it is understood that the chain 93 exists on each side of the tank for supporting opposite ends of the cylindrical members 101.

Figure 12:
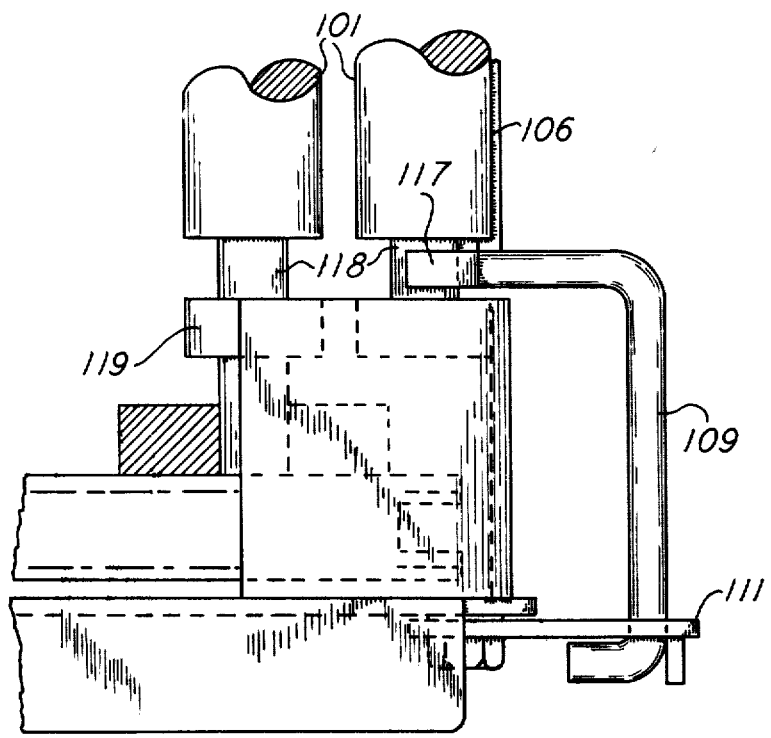
FIG. 12 is a top plan view of FIG. 11.
Figure 11:
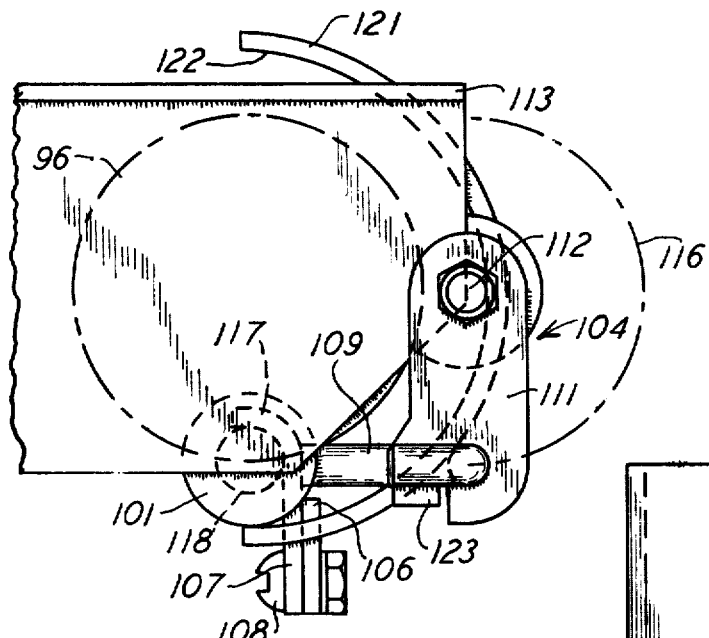
FIG. 11 is an enlarged side elevational view of a fragment of the apparatus shown in FIG. 7, and with parts added thereto.
Figure 13:
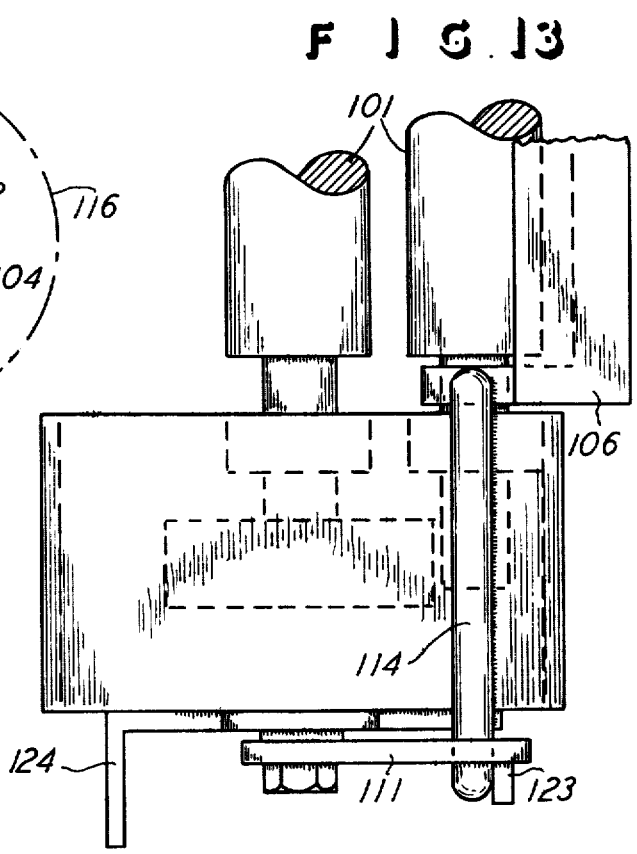
FIG. 13 is an end elevational view of FIG. 12.

A wiper mechanism, generally designated 104 and shown in FIGS. 11, 12 and 13, is disposed in the location of the outlet opening 81 to engage the members 101 and to remove the oil which they have picked up in their movement across the upper layer of the liquid mixture in the main portion of the tank 61. Thus a wiper blade 106 extends generally across the tank and engages the circumference of the cylindrical member 101 which is rotated as it moves past the outlet 81 and thereby rolls itself against the wiper blade 106 to remove the oil from the member 101 and permit the oil to move into the chamber 88. The wiper blade 106 is mounted on a piece 107 by means of a bolt 108, and the piece 107 is fixedly attached to a rod 109 which in turn is pivoted on a link 111. Of course there is a duplicate of this construction on each side of the tank as will be apparent. The arm 111 is pivotally mounted on a bolt 112 affixed to the angle iron 113 which supports the pusher mechanism being described. Thus the arm 111 can pivot about the bolt 112 and the rod 109 at its intermediate length designated 114 will follow the semi-circular path designated 116 and shown in dot-dash lines. That is, the piece 107 has a finger 117 which engages a reduced portion 118 on each of the cylindrical members 101, and therefore the piece 107, carry the wiper 106 upwardly as the members 101 move past the opening 81, as mentioned. The members 101 have ends designated 119, and these ends engage a semi-circular guide 121 which causes the members 101 to rotate as they move along the inside surface 122 of the guide 121, and this creates the wiping action through the elongated blade 106. The link 111 has a tang 123 which supports the rod 109 in the horizontal position, such as that position shown in FIG. 11, and this is while the rod 109 awaits the positioning of the member 101 to the position shown in FIG. 11. Further, FIG. 13 shows a stop 124 which is positioned in the path of the link 111 when the link is swung along the arc 116 and to its upper position, and the stop 124 therefore causes the link 111 and the rod 109 to move downwardly to the FIG. 11 position after the member 101 has moved to the left of the guide 121 as viewed in FIG. 11.

FIG. 12 shows the wiper mechanism with the link 111 and the rod 109 in slightly different positions from that shown in FIG. 11, and those positions would be when the link 111 has moved halfway up the arc 116, and FIG. 12 shows the finger 117 engaged on the cylinders reduced portion 118, as mentioned. Thus the guide 121 is concentric with the sprocket 96 so that the cylindrical members 101 are guided along the surface 122 and are rotated in that arcuate movement along the surface 122, all for the wiping action indicated and described.

FIG. 10 shows the cylindrical member 101 moving through the upper layer of liquid and it shows the member being slightly submerged below the level designated L, and some of the upper layer will therefore be drawn or pushed into the outlet opening, 81, as desired.

FIG. 14 shows the adjustable member 76 under the control of an electric motor 126, through means of a conventional rack 127 and a pinion designated 128 and being on the end of the shaft of the motor 126, in any conventional arrangement. Thus action of the motor 126 will cause rotation of the pinion 128 and corresponding movement of the rack 127 which has a back back-support 129 against which the rack 127 can slide, and the rack therefore raises and lowers the adjustable member 76 relative to the wall 73. Further, through conventional arrangements commonly utilized and understood by one skilled in the art, the pinion 128 can be driven by a one-way limit or slip clutch (not shown) which would cause the rack 127 and its attached adjustable member 76 to reach an elevation while the motor 126 is operating. Conversely, a tension spring 131 is shown attached between the member 76 and a fixed pin 132 on the wall 73 so that, when the motor is not running, the member 76 will be slowly lowered according to the tension in the spring 131.

In order to automatically control the operation of the motor 126, where such automatic control is desirable, a float 133 is disposed in the tank 61, such as in the position shown in FIG. 7, and the float has an electric sensor 134 and is connected through a wire 136 to a relay 137 which in turn is connected to a wire 138 to the motor 126. Another wire 139 can complete the circuit for the motor 126, in any conventional wiring arrangement. Thus, with oil being the lighter weight liquid in the tank 61, and since oil is an electric insulator, a layer of oil in the tank will prevent the sensor 134 from making contact with the wire 139 which is connected to the tank for completing the wiring. However, when there is no oil in the tank, then the sensor 134 will make electric contact through the non-oil liquid in the tank, and then the electric circuit will be completed, and the relay 137 will sense that condition.

FIG. 16 shows a schematic wiring diagram for this, and it will here be seen that there is the float sensor 134 and the relay 137 and the motor 126 connected with the wires 138 and 139. The sensor 134 is a normally open type of switch, and the relay 137 has a normally closed switch. Therefore, with that wiring arrangement, when there is oil in the tank, the circuit between the sensor 134 and the wire 139 is not complete, due to the insulation of the oil, and the normally open float switch leaves the normally closed relay switch in the closed position and therefore the motor 126 will run to raise the adjustable member 76 and thereby cause the layer of oil to come up to the level of the outlet 81 as designated by the edge 82 and thus the oil will go out the outlet 81, as desired. Conversely, when the tank has no oil in it, then the circuit is in essence completed between the sensor 134 and the wire 139 and the float switch is then closed and the relay switch 137 is then open and the motor is not running and the spring 131 can return the adjustable member 76 to a downward position.

Thus, the embodiment shown in FIGS. 7 through 16 has the addition of the pusher mechanism 92 and the wiper mechanism 104 and the automatic adjustable mechanism for the setting of the elevation of the outlet 77, and these several features are in addition to the embodiment shown in FIG. 1 and they may be employed as preferred and needed. The general idea is that when oil is present in the tank, then the level of the mixture in the tank is established so that the upper layer of oil will move through the outlet opening 81. Of course the inlet 66 and the outlet 69 are on opposite sides of the tank so that the lighter weight liquid will float to the top in the central or main portion of the tank, rather than move directly across the bottom portion of the tank and into the outlet passageway 69. With regard to creating this main portion of the tank which is a quiet area, the inlet pipe 67 has its lower outlet end 141 extending below the liquid level L so that the liquid and even the passageway 66 is not turbulent as it moves through the space 142 as shown by the arrow D.

Thus, in both embodiments, the oil stays in the center main portion of the tank and floats to the top and does not enter the outlet passageway 41 or 69. Further, the adjustable baffle at the upper end of the outlet passageway may be automatically or manually set, in the manners disclosed or that which is obvious and for the purposes mentioned. Also in both embodiments, the adjustable baffles 48 and 76 are of course fluid-tight with their respective stationary mountings or walls so that the level of the fluid is established by the upper edge of the respective baffles 48 and 76.

What is claimed is:

1. Separator apparatus for separately recovering two different liquids and solids from a liquid mixture, comprising two tanks disposed in an upper and lower relationship and with each including a bottom and upright side walls for containing a liquid mixture which includes solids and two liquids of different weights, liquid-flow members extending between said tanks for liquid flow therebetween and with said members terminating in an inlet opening for the entry of said liquid mixture into the upper one of said tanks, a liquid conduit having a liquid entrance disposed adjacent said bottom of said upper tank in liquid-flow communication with said upper tank, said said entrance for flotationally filling said conduit with liquid from the lower portion of said upper tank, said conduit having a liquid outlet disposed at an elevation higher than the elevation of said entrance, for the flow of liquid out of said conduit to establish the upper level of the liquid mixture in said upper tank, said upper tank having a liquid skimmer flow member presenting a tank flow outlet disposed at an elevation higher than the elevation of said entrance for skimming the lighter weight liquid off the upper portion of said liquid mixture, said liquid outlet and said bottom of the lower one of said tanks being at relative elevations such that said liquid outlet is at an elevation higher than said bottom of said lower tank, an additional liquid flow member extending between said tanks and being in liquid-flow communication with said liquid outlet and said lower tank for passing the remainder of said liquid mixture to said lower tank from whence said remainder can be re-cycled through the first-mentioned said liquid-flow members and to said upper tank, a liquid tap-off connection in liquid-flow communication with said first-mentioned liquid-flow members for diverting a selected quantity of said liquid away from flow to said upper tank, and a hydro-cyclotron being in fluid-flow connection with said first-mentioned liquid-flow members for directing the liquid mixture toward said inlet opening in said upper tank, and said hydro-cyclotron having an outlet opening for directing said solids out of said liquid mixture.

2. The separator apparatus as claimed in claim 1, wherein said tank flow outlet is disposed at an elevation higher than the elevation of said conduit liquid outlet.

3. The separator apparatus as claimed in claim 1, wherein said liquid skimmer flow member is movably mounted for vertical adjustment relative to said upper tank for determining the level of skimming from the liquid in said upper tank.

4. The separator apparatus as claimed in claim 1, wherein said liquid skimmer flow member is an elongated conduit extending into said upper tank with the longitudinal axis of said elongated conduit being horizontally oriented, and with said elongated conduit being rotatably mounted on said upper tank for rotation about said axis, and said elongated conduit having a fluid-flow passageway in the side wall thereof for selective elevational positioning upon rotation of said elongated conduit for determining the level of skimming from the liquid in said upper tank.

5. The separator apparatus as claimed in claim 4, wherein said elongated conduit is disposed on said upper tank to have said fluid-flow passageway disposed at an elevation higher than the elevation of said conduit liquid outlet.

6. The separator apparatus as claimed in claim 1, wherein said liquid conduit includes an adjustable member for adjustably positioning the elevation of said liquid outlet.

7. The separator apparatus as claimed in claim 1, including a vertically adjustable member operative on said liquid outlet for raising and lowering the elevation of said liquid outlet relative to the elevation of said tank flow outlet.

8. The separator apparatus as claimed in claim 7, including a sensor operative on the liquid mixture in said upper tank for detecting presence of a liquid at the upper surface of the liquid mixture, and connecting mechanism operatively connected between said sensor and said adjustable member for positioning the latter according to the presence of the liquid at the upper surface of the liquid mixture.

9. The separator apparatus as claimed in claim 1, including a liquid outlet chamber in liquid-flow communication with said liquid outlet, and two vertically spaced-apart openings in liquid-flow communication with said chamber for the flow of liquid from said chamber, whereby further separation of the lighter and heavier weight liquids is effected.

10. The separator apparatus as claimed in claim 1, including a mechanism movable across said upper tank at the upper level of the liquid therein and in the direction toward said liquid outlet for pushing the liquid into said liquid outlet.

11. The separator apparatus as claimed in claim 1, including an elongated member extending across said upper tank at the upper portion thereof, a moving device connected with said member for moving said member across the upper surface of the liquid and toward said liquid outlet and also out of the liquid.

12. The separator apparatus as claimed in claim 11, including a wiper disposed for engagement of said elongated member for wiping the liquid off said member when said member is out of the liquid.

13. The separator apparatus as claimed in claim 12, including an interconnector connected with said wiper and being releasably connected with said elongated member for moving said wiper with said elongated member.

14. The separator apparatus as claimed in claim 13, 13, wherein said elongated member is a cylindrical member, and a member engageable with said cylindrical member for rotating the latter when the latter is engaged with said wiper.

15. The separator apparatus as claimed in claim 1, including a pusher mechanism extending across said upper tank at the upper portion thereof and engageable with said liquid and movable toward said liquid outlet for moving the liquid to said liquid outlet.

16. The separator apparatus as claimed in claim 1, wherein said inlet opening is disposed adjacent said bottom of said upper tank to be in the bottom portion of said upper tank for introducing the liquid mixture into said upper tank at said bottom, and said upper tank being free of any obstruction between said inlet opening and said liquid entrance, for the free flow of liquid and said solids therebetween, whereby said solids are flown to said liquid conduit for flushing said upper tank free of said solids.

17. The separator apparatus as claimed in claim 1, including a liquid pump in liquid-flow communication with said first-mentioned liquid flow members for pumping liquid from said lower tank to said upper tank.

\* \* \* \* \*

UNITED STATES PATENT OFFICE
CERTIFICATE OF CORRECTION

PATENT NO. : 3,894,949
DATED : July 15, 1975
INVENTOR(S) : Siegmund J. Enzmann

It is certified that error appears in the above-identified patent and that said Letters Patent are hereby corrected as shown below:

In Claim 1, column 9, line 20, between "said said" insert --conduit extending upwardly from its--.

In Claim 14, column 10, line 47, cancel "13,".

Amend the title to include --and solids-- after "liquids".

Signed and Sealed this fourteenth Day of October 1975

[SEAL]

Attest:

RUTH C. MASON
*Attesting Officer*

C. MARSHALL DANN
*Commissioner of Patents and Trademarks*